(12) United States Patent
Rohlicek

(10) Patent No.: US 8,073,304 B2
(45) Date of Patent: Dec. 6, 2011

(54) PORTABLE RECORDED TELEVISION VIEWER

(75) Inventor: Gregory Karel Rohlicek, Watertown, MA (US)

(73) Assignee: Gregory Karel Rohlicek, Watertown, MA (US)

( * ) Notice: Subject to any disclaimer, the term of this patent is extended or adjusted under 35 U.S.C. 154(b) by 1207 days.

(21) Appl. No.: 10/295,369

(22) Filed: Nov. 16, 2002

(65) Prior Publication Data

US 2004/0095516 A1 May 20, 2004

(51) Int. Cl.
H04N 5/765 (2006.01)
H04N 7/173 (2006.01)
H04N 7/16 (2006.01)

(52) U.S. Cl. ........ 386/200; 386/231; 725/133; 725/141; 725/153

(58) Field of Classification Search ............ 725/80, 725/141, 74, 153, 85, 81, 133; 348/838
See application file for complete search history.

(56) References Cited

U.S. PATENT DOCUMENTS

| | | | |
|---|---|---|---|
| 5,899,855 A * | 5/1999 | Brown | 600/301 |
| 6,233,389 B1 | 5/2001 | Barton et al. | |
| 6,315,669 B1 | 11/2001 | Okada et al. | |
| 6,322,447 B1 | 11/2001 | Okada et al. | |
| 6,338,679 B1 | 1/2002 | Okada et al. | |
| 6,369,827 B1 | 4/2002 | Pan et al. | |
| 6,371,854 B1 | 4/2002 | Ikeda et al. | |
| 6,500,070 B1 | 12/2002 | Tomizawa et al. | |
| 6,743,104 B1 * | 6/2004 | Ota et al. | 463/44 |
| 6,959,221 B1 * | 10/2005 | Kataoka | 700/94 |
| 7,072,569 B2 * | 7/2006 | Lakhansingh | 386/46 |
| 7,170,936 B2 * | 1/2007 | McVeigh et al. | 375/240.01 |
| 2001/0029583 A1 | 10/2001 | Palatov et al. | |
| 2002/0045484 A1 | 4/2002 | Eck et al. | |
| 2002/0138851 A1 * | 9/2002 | Lord et al. | 725/133 |
| 2003/0050116 A1 | 3/2003 | Chen | |
| 2003/0080963 A1 | 5/2003 | Van Hook et al. | |
| 2003/0091325 A1 | 5/2003 | Estevez | |
| 2004/0250291 A1 * | 12/2004 | Rao et al. | 725/131 |

OTHER PUBLICATIONS

GameBoy Advance Video [online]. gba-video.majescoentertainment.com. Nov. 29, 2004 [retrieved Sep. 29, 2007]. Retrieved from internet: <http://web.archive.org/web/20051211090939/gba-video.majescoentertainment.com/nov2904.htm>.*

* cited by examiner

*Primary Examiner* — Brian Pendleton
*Assistant Examiner* — Jason Lin
(74) *Attorney, Agent, or Firm* — Occhiuti Rohlicek & Tsao LLP

(57) ABSTRACT

An approach to recording of television programming for later viewing makes use of a small and relatively inexpensive handheld portable viewer. One or more television programs are loaded into the viewer from a receiver, such as a cable television set-top box. Later, the user selects a loaded program for viewing on the handheld viewer

13 Claims, 6 Drawing Sheets

PORTABLE RECORDED TELEVISION VIEWER

BACKGROUND

This invention relates to viewing recorded television programming in a portable device.

Today, television programming is typically viewed on a television set that receives programming that is broadcast over the air from local television stations, or distributed over a cable or satellite-based television network to an in-home terminal such as a "cable box" (also known as a set-top box or a home communication terminal, HCT) that is connected to the viewer's television set. Portable television sets are available for receiving and viewing programming as it is broadcast from local television stations.

Television programming can be recorded on a video tape recorder for later viewing. The most common type of recorder uses VHS tape cartridges. Portable players for recorded VHS tapes are available, for example, integrated with television sets. However, such integrated units are typically large, heavy and not portable, although some players are available for use in cars. In addition to recording television programming on VHS tapes, users can buy or rent prerecorded VHS tapes, for example, with movies recorded on them. DVDs (Digital Video Disks, Digital Versatile Disks) are becoming more popular than VHS for prerecorded movies and programming, and relatively small but expensive portable DVD players are available. As in-home recorders for DVDs become available it is expected that recordable DVDs will begin to replace VHS tapes as a common type of recordable medium. Television programming can also be recorded on an internal storage device in a digital recorder (also known as a Personal Video Recorder, PVR) in the home for later viewing.

Recording and viewing of television programming using the approaches and devices described above either makes use of relatively large and heavy equipment, such as a VHS tape player and a portable television set, or uses expensive equipment such as an in-home DVD recorder and a portable DVD player.

SUMMARY

In a general aspect, the invention features an approach to the recording of television programming for later viewing on a small and relatively inexpensive hand-held viewer. One or more television programs are loaded into the viewer from a receiver, such as a cable television set-top box. Later, the user selects a loaded program for viewing on the handheld viewer.

In one aspect, in general, the invention features a method for portable viewing of television programs. One or more television programs are received at a terminal coupled to a television system. A first of the television programs is encoded at the terminal. This encoding includes digitally compressing the first of the television program. Communication is established between a portable device and the terminal. This includes downloading the encoded first of the television programs from the terminal to the portable device. At the portable device when it is not in communication with the terminal, a command is accepted from a user to play the downloaded first of the television programs. In response the play command from the use-, the portable device presents the downloaded program to the user using a screen on the portable device.

In another aspect, in general, the invention features a portable device for viewing of audio-video programs. The portable device has a communication port for communicating with a terminal coupled to a television system. A memory in the device is used for storing digitally compressed audio-video programs received through the communication port from the terminal, and a screen on the device is used for displaying video of the stored programming. The device includes a processor coupled to the communication port, the memory, and the screen. The processor is programmed to control operation of the device by downloading digitally compressed audio-video programming from the communication port, storing the programming in the memory, accepting commands from a user, and playing the stored programming to the user according to the accepted commands.

In yet another aspect, in general, the invention features a system for viewing television programs. The system includes a terminal coupled to a television system, such as a set-top box connected to a cable television system. The terminal includes a receiver for accepting television programs from the television system, a decoder for transmitting the programs to a television set, and an encoder for processing accepted television programs by digitally compressing the programs. The system also includes a portable device for viewing television programs. The portable device includes a communication port for communicating with the terminal, a memory for storing digitally compressed television programs received through the communication port from the terminal, a screen coupled for displaying video of the stored programming, and a processor. The processor is programmed to control operation of the device by downloading digitally compressed television programs through the communication port, storing the programs in the memory, accepting commands from a user, and playing the stored programs to the user according to the accepted commands.

Aspects of the invention can include one or more of the following advantages.

The device can be small and light, which increases its portability. For example, the device can be significantly smaller and lighter than a VHS tape player.

The device does not have to provide the full resolution of a television set. This can make the device less expensive, for example, as compared to a portable DVD player.

The functionality of the portable device can be provided, at least in part, by a commercially available programmable game console that accepts cartridges, which may make the device less expensive.

Other features and advantages of the invention are apparent from the following description, and from the claims.

DESCRIPTION OF DRAWINGS

FIG. 3A is a diagram that illustrates a cradle into which a portable cradle is inserted;

FIG. 3B is a diagram that illustrates wireless downloading;

FIG. 3C is a diagram that illustrates a recordable cartridge that is used to download programming;

DESCRIPTION

Figure 1:
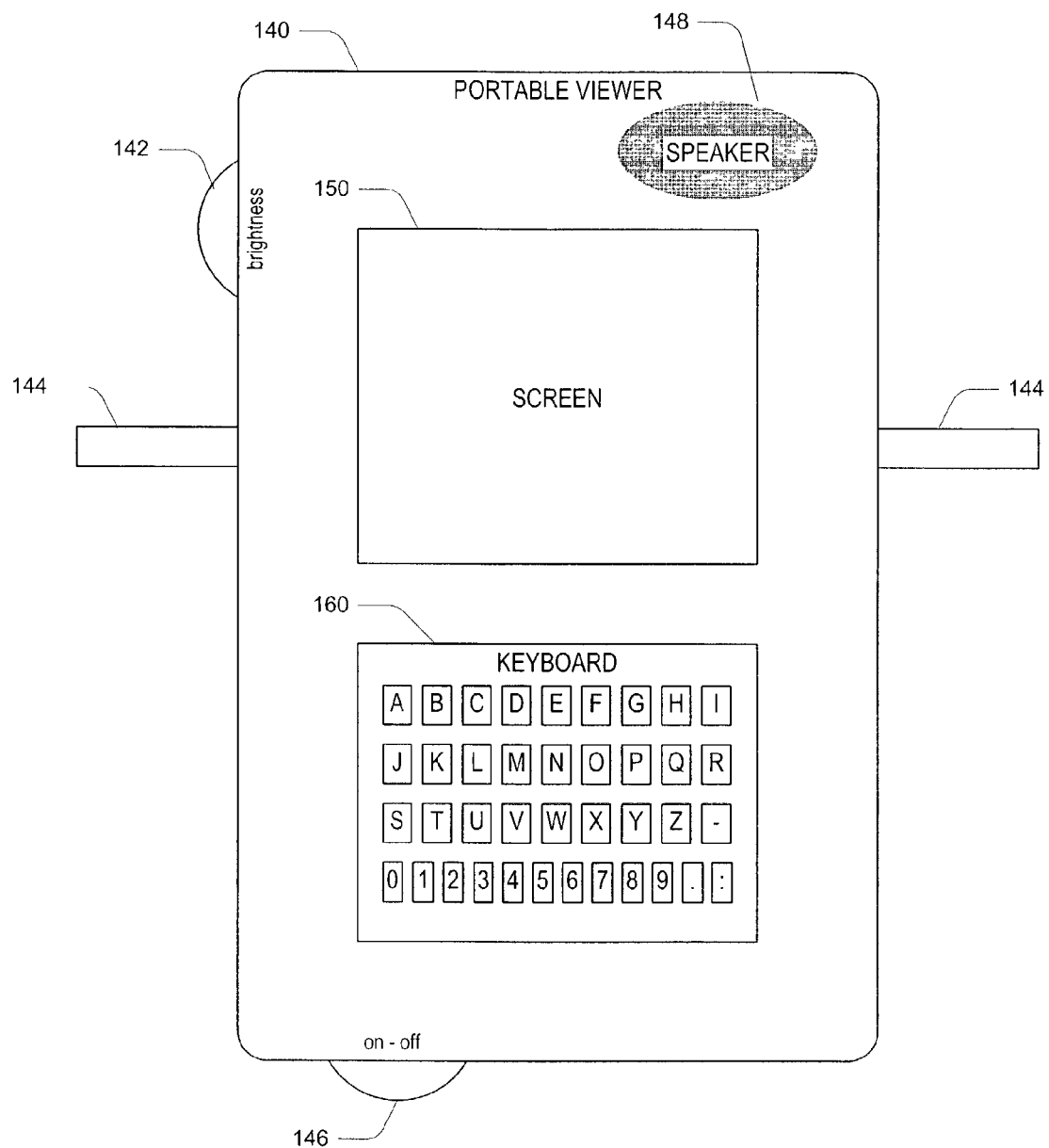
FIG. 1 is a front view of a portable viewer.
Figure 2:
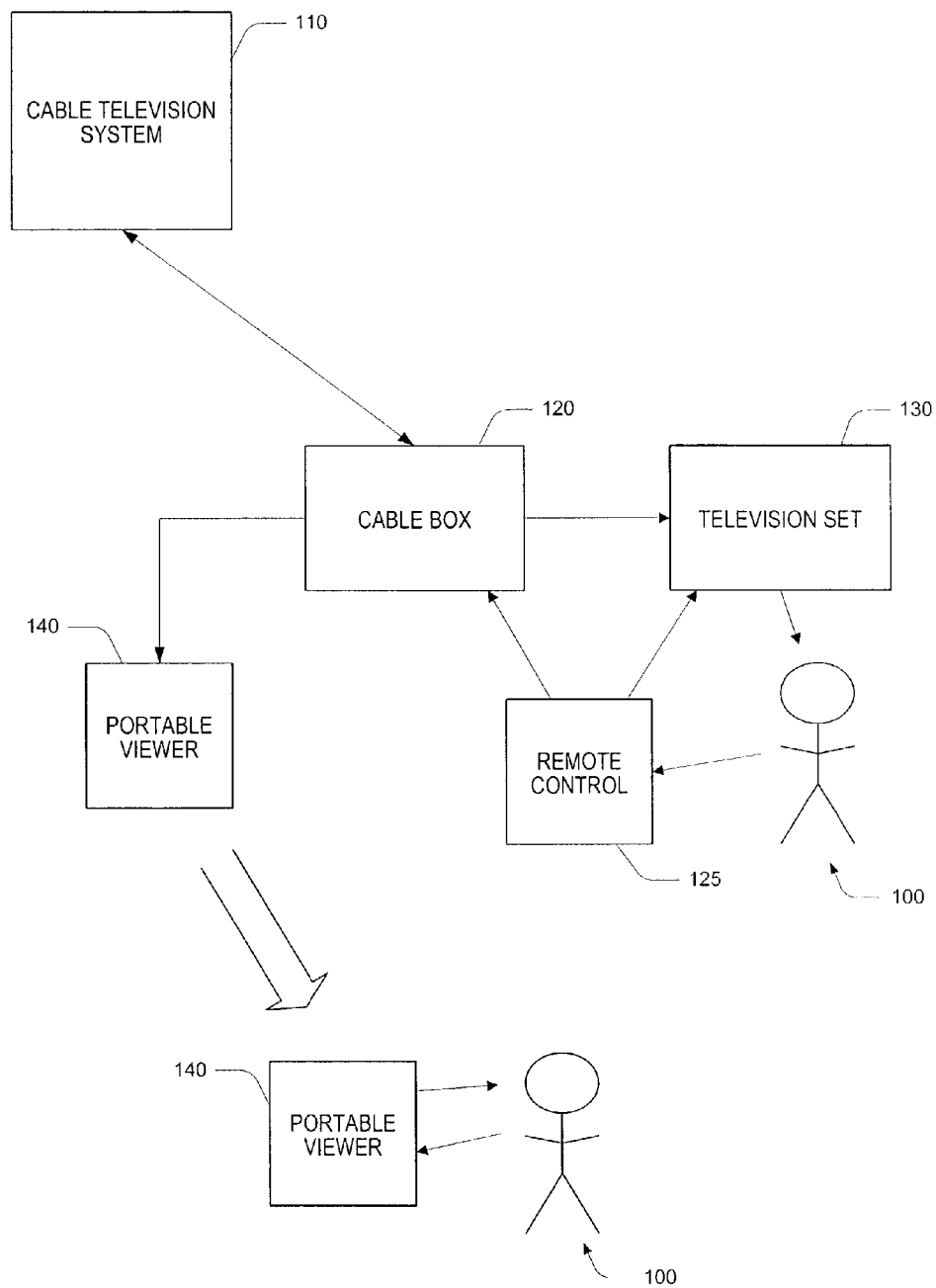
FIG. 2 is a block diagram that illustrates use of a portable viewer in conjunction with a cable television system.

1 Overview (FIGS. 1 and 2)

Referring to FIG. 1, a portable viewer 140 is used to play a television program that a user previously downloaded to the viewer. The portable viewer 140 is battery operated and includes a built-in screen 150 for displaying the video for the program and a built-in speaker 148 for playing the audio for the program. FIG. 1 shows one version of the viewer, illustrated approximately to scale and at actual size. Overall, this version of the viewer is approximately six inches high and four inches wide, thereby making it suitable for hand-held use. Optional or removable handles 144 protrude from the sides of the viewer to make it easier for a user to hold. The user controls the portable viewer 140 using an on-off switch 146, which optionally also controls the volume of the audio played on the speaker 148, and a brightness control 142, that controls the brightness of the video displayed on the screen 150. The portable viewer 160 also includes a keyboard 160, which includes both alphabetic and numeric keys, through which the user enters commands or other information. As is discussed further below with reference to operation of the device, these commands include requests to display particular downloaded programs if multiple programs have been downloaded to the player.

Referring to FIG. 2, the user 100 downloads television programs from a cable television system 110 to the portable viewer 140. In normal viewing of television programs, the user 100 uses a standard remote control 125 which controls a cable box 120 and a television set 130 to present television programs to the user 100. For example, the user 100 uses the remote control to select a desired station on the cable box 120 and uses the remote control to adjust the audio volume on the television set 130.

In addition to standard features, cable box 120 communicates with the portable viewer 140 to download data that encodes a television program to the portable viewer. Furthermore, the cable box 120 receives commands sent by the user 100 using the remote control 125 that cause the cable box 120 to download particular programs to the portable viewer. For example, one such command causes the cable box 120 to download the television program that is currently being presented on the television set 130 to the portable viewer 140. This can be useful if the user 100 cannot watch the end of a program because the user can then command the cable box to download the remainder of the program so that he or she can later view it on the portable viewer 140.

After the program is downloaded to the portable viewer 140, the user 100 takes the viewer with him or her away from the cable box 120, for example, to another room in the house or a trip in a car. While away, the user 100 uses the portable viewer 140 to watch the downloaded program.

Figure 3A:
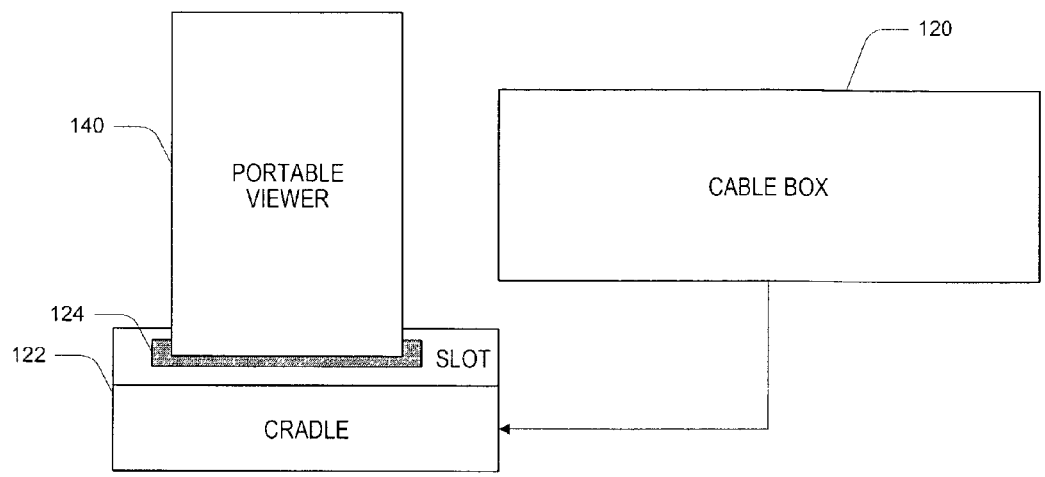
FIGS. 3A-3C are diagrams that illustrate alternative program downloading approaches.
Figure 3B:
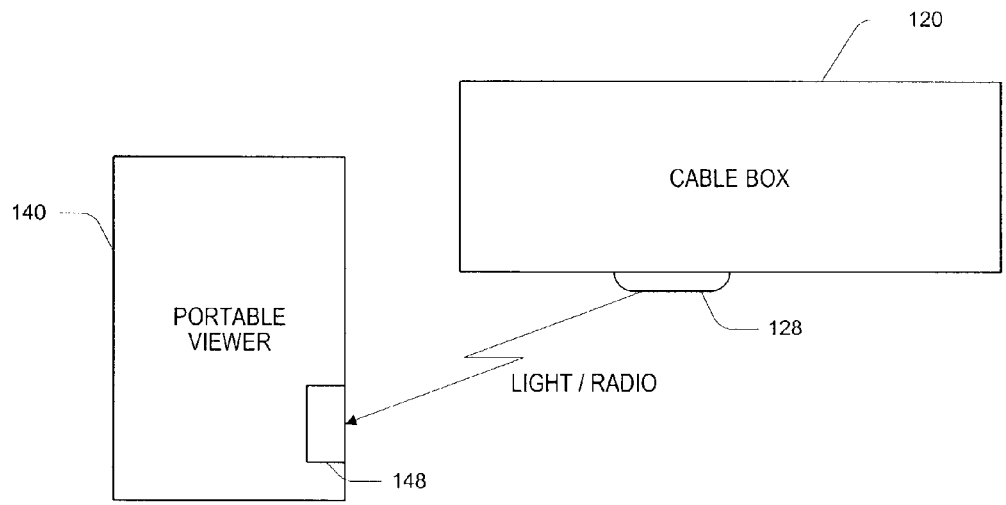
Figure 3C:
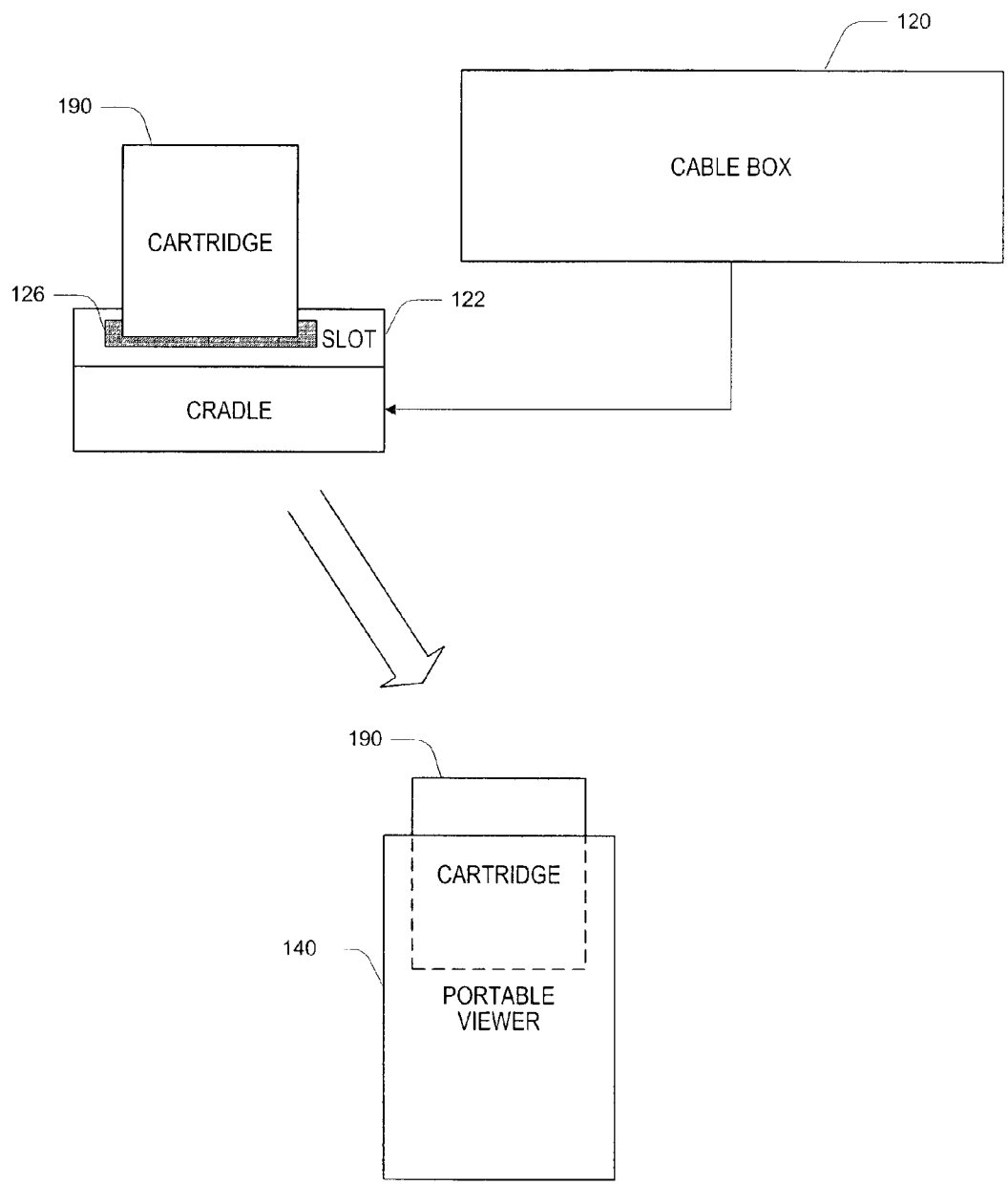

2 Downloading Programs to the Portable Viewer 140 (FIGS. 3A through 3C)

Referring to FIG. 3A, the first version of the portable viewer 140 uses a cradle 122 for communicating with the cable box 120. The cradle 122 has a slot 124 into which the portable viewer 140 is inserted so that the cable box can download programs to the viewer. The slot includes the ends of wires leading to the cable box over which the downloaded television program is sent to the viewer, and the viewer includes wires that touch the wires in the cradle when it is inserted so that it can receive the downloaded television program.

In FIG. 3A, the cradle 122 is shown as a being separate from the cable box 120. In another version of the system the slot 124 can be built into the cable box so that the portable viewer 140 can be inserted directly into the cable box.

There are other ways in which the downloaded television program can be sent to other versions of the portable viewer 140. Referring to FIG. 3B, the portable viewer 140 can be placed close to the cable box 120 without actually plugging it in or inserting it into a slot or cradle. The downloaded television program is then sent through the air from a transmitter 128 on the cable box to a receiver 148 on the portable viewer 148. For example, such wireless communication can work like a remote control so that the cable box shines a light that carries the television program to the portable viewer. This could also work like a radio so that the receiver 148 has a small radio receiver for receiving the television program transmitted from the cable box.

Referring to FIG. 3C, another version of the portable viewer 140 uses a small cartridge 190, which is similar to a Gameboy® cartridge. In this version of the system, there is again a cradle 122 as was shown in FIG. 3A, but rather than inserting the entire portable viewer 140 into a slot, the cartridge 190 is inserted into another kind of slot 126. The television program is sent from the cable box 120 to the cartridge 190. The user then takes the cartridge out of the cradle 126 and inserts it into the portable viewer 140.

Figure 4:
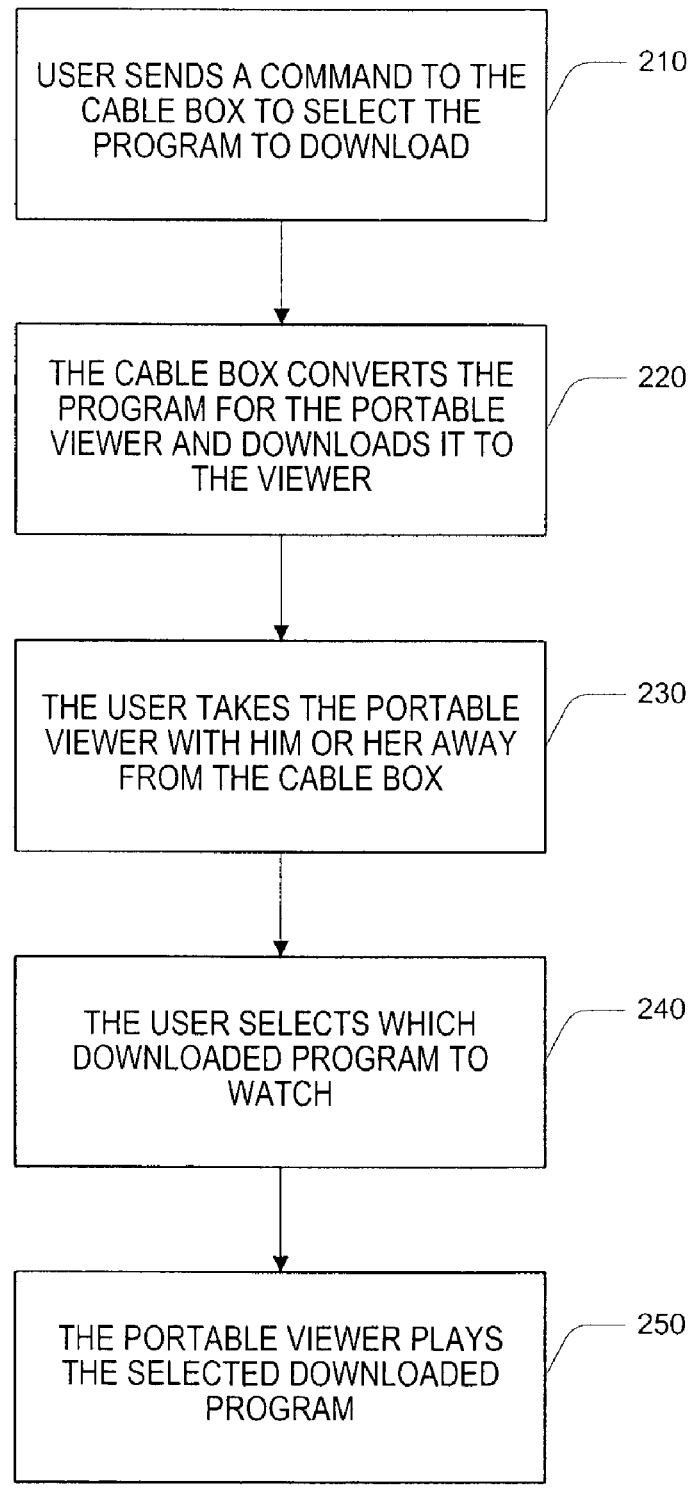
FIG. 4 is a flowchart of operation of the system.

3 Using the Portable Viewer 140 (FIG. 4)

Referring to FIG. 4, operation of the system generally follows a sequence of steps shown in the figure. First, the user sends a command to the step-top box to select the program to download (step 210). This command can take a number of forms, including a command to download the current television program being viewed by the user, or a command to download a particular program at a later time. Choosing such a later program can involve browsing through a program guide that is displayed on the television set and selecting the program on the display. The user leaves the portable viewer 140 connected to the cable box 120.

When the television program is available, the cable box 120 converts the television program so that it can be downloaded into the portable viewer 140 (step 220). In general, the screen 150 of the portable viewer has less resolution (for example, a fewer number of dots on the screen, fewer different colors that can be concurrently displayed, or fewer images per second) than a television set, so the video of the television program is converted so that it can be displayed at that lower resolution. Also, the portable viewer may have a limited amount of space to store the television program, so the cable box may have to convert the program so that it does not take up as much space using a digital compression approach, for example, also reducing the resolution. The audio part of the television program may also be converted so that it has an appropriate format and size for downloading to the portable viewer 140. The cable box then downloads the converted television program to the portable viewer 140 using one of the types of mechanisms that are shown in FIGS. 3A-3C.

The user then takes the portable viewer 140 with him or her, for example on a trip (step 230). The portable viewer 140 does not need to be turned on to keep the program stored in it.

Later, when the user wants to watch a downloaded television program, he or she turns on the portable viewer 140 using the on-off switch 146 and selects which program he or she wants to watch, for example, by typing the name of the television program on the keyboard 160 of the portable viewer 140 (step 240).

In response to the user's input that selects the program, the portable viewer 140 plays the downloaded television program using the screen 150 and the speaker 148 in the portable viewer (step 250). The user can also input commands to pause or rewind the program, and can adjust the brightness of the screen using the brightness knob 142.

Figure 5:
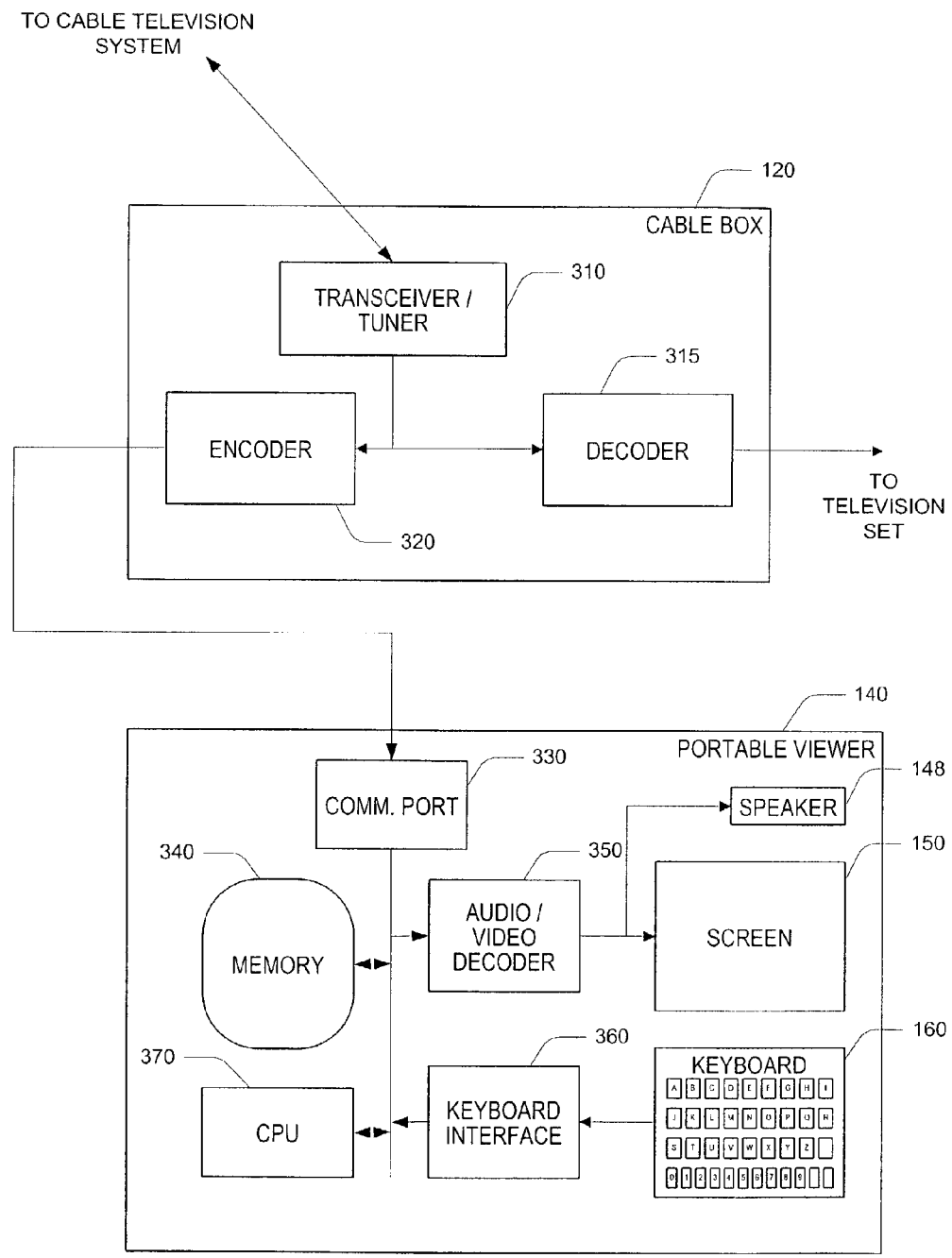
FIG. 5 is a block diagram that illustrates components of a portable viewer and a cable box.

4 Internal Components (FIG. 5)

Referring to FIG. 5, portable viewer 140 includes a number of internal components. The viewer includes a communication port 330 through which downloaded television programs pass from the cable box 120 to other components inside the portable viewer 140. In the version of the portable viewer that plugs into a slot 124 in a cradle 122 (see FIG. 3A), the communication port 330 includes the wires and circuits that connect to the wires in the cradle.

The portable viewer 140 includes a computer processor (also referred to as a central processing unit, or CPU) 370 that runs a program that controls operation of the portable viewer. It uses a program that is stored in a memory 340. One program that the CPU 370 runs is used to receive the downloaded television program from the communication port 330 and to store it in the memory 340.

Another program that the CPU 370 runs lets the user choose the downloaded program to play. The CPU 370 can tell what the user is typing on the keyboard 160 using a keyboard interface 360 that includes electronic circuits that are connected to the keys of the keyboard. Based on the commands that the user types, the program gets the stored television program from the memory 340. The stored television program needs to be converted so that it can be played on the screen 150 and speaker 148. The portable viewer includes an audio/video decoder 350, which includes specialized electronics for converting the stored television program into the appropriate form for playing.

In the versions of the portable viewer 140 that use a removable cartridge 190 (see FIG. 3C), the cartridge becomes part of the memory 340 when it is inserted in the portable viewer 340 so that the CPU 370 can get the stored television program to pass through the audio/video decoder 350.

The cable box 120 includes a transceiver/tuner 310 that is used to communicate with the rest of the cable television system. For example, the transceiver/tuner includes the electronic circuits that tune the box to a chosen television station. The television programs come from the cable television system and are received by the transceiver/tuner before being passed to other components in the cable box 120. For playing television programs on the television set, the cable box includes a decoder 315 that converts the television program into the appropriate format so that it can be played on an attached television set. For example, the decoder makes it look like the television program is coming in on channel 3 even through the cable box 120 is tuned to channel 25.

In addition to these standard components, the cable box 120 includes an encoder 320. Recall that the cable box 120 generally needs to convert the format of the television program so that it can be downloaded to the portable device. The encoder 320 is that part of the cable box that does this conversion.

The components of the cable box 120 are illustrated without showing whether they are implemented using electronic circuits, computer programs, or both. In general, they are implemented using a combination of specialized circuits and a computer processor that runs a program inside the cable box.

5 Other Versions

The versions of the portable viewer 140 described above can be specially built for playing television programs. Another version of the system uses portable devices that were designed for another purpose. One such version uses a portable game player, such as a Nintendo Gameboy Color® or a Gameboy Advance®. This version of the system is like the version shown in FIG. 3C with the cartridge being compatible for insertion into a Gameboy. Because the Gameboy was not designed to play television programs, part of the program that controls how the television programs are played is also stored on the Gameboy cartridge.

Another version of the system uses a portable viewer 140 that is built to play television programs. In addition, it has a slot so that a game cartridge, such as a Gameboy cartridge, can be plugged in and the portable viewer can be used to play a game. With this version, the user does not need two separate devices if he or she wants to both play games and view television programs on a trip.

If a cartridge version of the portable viewer becomes popular, stores could sell or rent cartridges to users so that they can view the programs that have already been downloaded to the cartridges.

Another version of the portable viewer 140 has a built-in television tuner so that the user can watch locally broadcast television programs that he or she did not download.

Another version of the viewer is meant for use in a car, and plugs into a cigarette lighter to get its power without running down its batteries. Another version for a car is built in and uses cartridges that are plugged into it.

Other versions of the viewer can be larger or smaller than the one shown in FIG. 1. The screen can be about two inches by two inches in size, or larger or smaller, and can be the same type that is used on laptop computers (for example, a liquid crystal display, LCD). Also, the arrangement of controls can be different than shown in FIG. 1. For example, the brightness knob 142 can be hidden behind a door so that it is not accidentally adjusted. Also, instead of a keyboard, other kinds of buttons with arrows or markings.

Another version of the system uses television programs that have already been recorded in a recorder in the user's house. For example, if the user has already recorded a program in a personal video recorder (PVR), such as a TiVo® record, the PVR rather than the cable box communicates with the personal viewer and downloads an appropriately formatted program into the portable viewer.

The approach described above can work equally well with a satellite television system as with a cable television system. The function of the cable box could also be performed by a personal computer that receives television programs and movies over a network such as the Internet.

The approach described above is equally applicable to television programs, including cartoons, as well as live people, as well as movies.

What is claimed is:

1. A method for portable viewing of recorded television programs on a handheld portable game console that is not adapted to play television programs, the method comprising:
receiving one or more television programs at a user terminal coupled to a television system, including storing the television programs in a video recorder associated with the terminal;
encoding a first of the television programs stored at the terminal, including digitally compressing the first of the television programs, the first of the television programs including non-cartoon video of live people;
transferring the encoded television program in conjunction with software for controlling how the television program is played to the portable game console on a recordable cartridge that is compatible for insertion and operation in a game slot in the game console, including
at the terminal, storing the encoded television program on a recordable cartridge, said cartridge also including software code for execution as a game on the portable game console to play the television program, and passing the recordable cartridge from the terminal to the game console and inserting the recordable cartridge in the game slot of the game console; and at the portable game console without connection to and distant from the terminal, executing the software code included on the recordable cartridge on a processor local to the console, the software code controlling operation of the game console as if the software were for a game, accepting a command from a user to play the downloaded first of the television programs, and in response accessing the television program on the cartridge and using the software on the cartridge to play the television program video to the user using a screen on the portable device.

2. The method of claim 1 wherein digitally compressing said program includes reducing a resolution of said program.

3. The method of claim 1 wherein the terminal comprises a television set-top box.

4. The method of claim 1 further comprising inserting the recordable cartridge into a cradle attached to the terminal.

5. The method of claim 1 further comprising repeating encoding and downloading multiple of the television programs.

6. The method of claim 5 further comprising accepting at the terminal coupled to the television system a command from a user identifying the first of the television programs.

7. A system for viewing of television programs comprising:

a terminal coupled to a television system, including a receiver for accepting television programs from the television system, a decoder for transmitting the television programs to a television set, and an encoder for processing accepted television programs by digitally compressing and reducing resolution of the programs; and a recordable cartridge adapted to be compatible for insertion in a game slot in a portable game console that is not initially configured for the purpose of viewing television programs;

wherein the terminal comprises a communication port for accepting the recordable cartridge and is configured for passing data to a memory in the cartridge for storing digitally compressed television programs; and wherein the recordable cartridge comprises software code for execution on a portable game console as if the software code were for a game to play a television program in the memory in the recordable cartridge, the television programs including non-cartoon video of live people.

8. The system of claim 7 wherein the terminal comprises a set-top box.

9. The system of claim 7 wherein the terminal includes a video recorder with a storage for holding television programs prior to processing the programs using the encoder.

10. The system of claim 7 wherein the communication port comprises a cradle for accepting the recordable cartridge.

11. The system of claim 7 wherein the recordable game cartridge is for use with a portable game console provided under a trademark Nintendo Gameboy, and includes software code for execution on the said portable game console.

12. The method of claim 1 wherein inserting the recordable cartridge in the game slot comprises inserting the recordable cartridge in a portable game console provided under a trademark Nintendo Gameboy.

13. A method for portable viewing of recorded television programs on a handheld portable game console that is not adapted to play television programs, the method comprising:

receiving a plurality of television programs at a user terminal coupled to a television system, including storing the television programs in a video recorder associated with the terminal, the programs including at least one program of each of cartoons, non-cartoon video of live people, and movies;

encoding the plurality of programs stored at the terminal, including digitally compressing said programs;

storing the encoded programs on a recordable cartridge that is compatible for insertion and operation in a game slot in the game console;

storing software code on the recordable cartridge for execution as a game on the portable game console to play the television programs, the software being for functions including enabling a user to select which of the plurality of television programs to play and controlling how said television program is played on the portable game console;

passing the recordable cartridge from the terminal to the game console and inserting the recordable cartridge in the game slot of the game console;

executing the software code included on the recordable cartridge on a processor local to the console, the software code controlling operation of the game console as if the software were for a game, including accepting a command from a user to play a first of the plurality of television programs on the cartridge, and in response accessing the television program on the cartridge and using the software on the cartridge to play the television program video to the user using a screen on the portable device.

* * * * *